BEST AVAILABLE COPY

United States Patent Office 3,296,195
Patented Jan. 3, 1967

3,296,195
CURABLE COMPOSITION
John C. Geossens, Scotia, N.Y., assignor to General Electric Company, a corporation of New York
No Drawing. Filed Dec. 20, 1963, Ser. No. 332,265
10 Claims. (Cl. 260—46.5)

This invention relates to fluid organopolysiloxanes which are capable of vulcanizing at room temperature to rubbery materials.

Room temperature vulcanizing silicone rubbers are well known in the art and these materials have been divided into two groups, one of which is designed for the addition of a curing catalyst at the point of use and which rapidly cures upon the addition of the catalyst. The second group of room temperature vulcanizing silicone elastomer comprises one-package materials which are adapted to cure upon exposure to atmospheric moisture. One of the most common types of such one-package room temperature vulcanizing silicone rubber is the type described, among other places, in French Patent 1,198,749, which materials are prepared by the addition of an organotriacyloxysilane, such as methyltriacetoxysilane, to a silanol chain-stopped polydiorganosiloxane fluid.

While these one-package room temperature vulcanizing silicone elastomers have extremely wide utility and are satisfactory for a great many applications, it is often found that these materials suffer from one or more disadvantages. For example, for some applications, the adhesion of these prior art materials to various surfaces leaves something to be desired. On the other hand, some of these one-package materials cure so rapidly that the work life is undesirably short. By work life is meant the time available after exposure of these compositions to the atmosphere for working these compositions to the desired shape. Finally, the physical properties of these prior art materials are generally independent of the amount and type of organoacyloxysiloxane employed so that for a given base polymer, i.e., a given silanol chain-stopped polydiorganosiloxane, and a given filler or combination of fillers, a product of only one specific set of physical properties can be obtained. It is often desirable to have the capability of providing a variety of physical properties, e.g., tensile strength, hardness or elongation, for a given base polymer and filler combination.

The present invention is based on my discovery of improved room temperature curable organopolysiloxanes which avoid all of the disadvantages heretofore mentioned of the prior art materials and which, in addition, permit the preparation of a wide variety of organopolysiloxanes from a single base organopolysiloxane fluid. More particularly, the present invention is based on my discovery that an organopolysiloxane curable to the rubbery, solid, elastic state at room temperature upon exposure to moisture is obtained by mixing, under substantially anhydrous conditions, an alkoxyacyloxysilane having the formula.

(1) 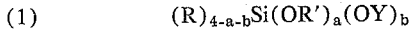$(R)_{4-a-b}Si(OR')_a(OY)_b$ with a silanol chain-stopped polydiorganosiloxane in proportions hereinafter described. In Formula 1, R is a member selected from the class consisting of monovalent hydrocarbon radicals, halogenated monovalent hydrocarbon radicals, and cyanoalkyl radicals, R' is a member selected from the class consisting of alkyl radicals and halogenated alkyl radicals, y is a saturated aliphatic monoacyl radical, a is an integer equal to from 1 to 3, inclusive, b is an integer equal to from 1 to 3, inclusive, and the sum of a plus b is equal to from 3 to 4, inclusive. Stated alternatively, the alkoxyacyloxysilanes within the scope of Formula 1 can be defined as silanes containing up to one silicon-bonded radical selected from the class consisting of monovalent hydrocarbon radicals, halogenated monovalent hydrocarbon radicals and cyanoalkyl radicals, at least one radical selected from the class consisting of alkoxy radicals and halogenated alkoxy radicals and at least one saturated aliphatic monoacyl radical.

The alkoxyacyloxysilanes of Formula 1 are of a class known in the art and many of the specific members of such class have been characterized. As an illustration of the radicals represented in Formula 1, it is noted that any of the organic radicals common to organosilicon chemistry can be found in such alkoxyacyloxysilanes. For example, radicals within the scope of R of Formula 1 include, for example, alkyl radicals, e.g., methyl, ethyl, propyl, butyl, octyl, etc. radicals; aryl radicals, e.g., phenyl, naphthyl, tolyl, etc. radicals; aralkyl radicals, e.g., benzyl, phenylethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals; various halogenated monovalent hydrocarbon radicals, such as, for example, chloromethyl, alpha-chloroethyl, beta-chloroethyl, chlorophenyl, dibromophenyl, trifluoromethylphenyl, trifluoromethylpropyl, etc. radicals; as well as cyanoalkyl radicals, such as, for example cyanomethyl, beta-cyanoethyl, beta-cyanopropyl, gamma-cyanopropyl, omega-cyanobutyl, etc, radicals. Illustrative of the radicals represented by R' of Formula 1 are methyl, ethyl, propyl, isopropyl, butyl, isobutyl, tertiary butyl, octyl, etc. radicals; chloromethyl, beta-chloroethyl, beta-fluoromethylethyl, 1,1,1 - trichloro - 2-methyl-2-propyl, etc. radicals. Illustrative of the saturated aliphatic monacyl radicals represented by y in the formula are acetyl, propionyl, butyryl, hexoyl, 2-ethylhexoyl, octanoyl, isovaleryl and stearyl. Preferably, the radicals represented by R in Formula 1 are phenyl or lower alkyl, with the preferred specific radical being methyl. R' is preferably an alkyl radical having from 1 to 4 carbon atoms. The acyl radical represented by y in Formula 1 is preferably a lower acyl radical with the acetyl radical being the preferred specific acyl radical.

Among the specific alkoxyacyloxysilanes within the scope of Formula 1 can be mentioned, as illustrations only and not as a complete list of such materials, the following: methoxytriacetoxysilane, dimethoxydiacetoxysilane, trimethoxyacetoxysilane, ethoxytriacetoxysilane, triethoxyacetoxysilane, methoxyethoxydiacetoxysilane, dimethoxydibutyroxysilane, t - butoxytriacetoxysilane, di-t-butoxydiacetoxysilane, tri-t-butoxyacetoxysilane, 1,1,1-trichloro-2-methyl - 2-propoxytriacetoxysilane, bis-(1,1,1-trichloro-2-methyl - 2-propoxy)dioctonyloxysilane, methylethoxydiacetoxysilane, methyl-t-butoxydiacetoxysilane, phenylmethoxydiacetoxysilane, phenyldimethoxyacetoxysilane and beta-cyanoethylmethoxydiacetoxysilane.

The alkoxyacyloxysilanes of Formula 1 can be prepared by a variety of techniques, any of which are suitable for the preparation of any of such materials but some of which provide better yields of a given material than others. As a first technique, silicon tetrachloride or an organotrichlorosilane, depending on the desired final product, can be reacted with acetic anhydride to produce the corresponding tetraacetoxysilane or organotriacetoxysilane plus acetyl chloride. The triacetoxysilane or tetraacetoxysilane is then reacted with the desired alkanol or halogenated alkanol in the ratio of one mole of alkanol for every mole of silicon-bonded acetoxy groups it is desired to replace. The product is then fractionally distilled to yield the desired product or a mixture of desired products. As a second alternative, an organotrialkoxysilane or tetraalkoxysilane can be reacted with acetic anhydride employing one mole of acetic anhydride per mole of silicon-bonded alkoxy groups it is desired to replace and the resulting mixture is fractionally distilled to produce the desired products. As a third alternative, an organotrialkoxysilane or tetraalkoxysilane can be reacted with tetraacetoxysilane or an organotriacetoxysilane to form an equilibrium mixture which, upon fractional distillation, would produce alkoxyacyloxysilanes. While these various processes have been described in terms of preparation of alkoxyacyloxysilanes in which the acyl radical has been the acetyl radical, it is obvious that the corresponding reactions with acyl radicals other than the acetyl radical are used to produce organoacyloxysilanes with other silicon-bonded acyloxy groups.

The liquid silanol chain-stopped polydiorganosiloxanes which can be employed in the practice of the present invention have the formula:

(2) 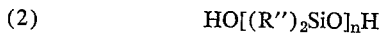 HO[(R'')$_2$SiO]$_n$H where R'' is of the same scope as R of Formula 1 and is a member selected from the class consisting of monovalent hydrocarbon radicals, halogenated monovalent hydrocarbon radicals and cyanoalkyl radicals and $n$ has a value of at least 10, e.g., from about 10 to 10,000 or more. Preferably, the R'' radicals of Formula 2 are methyl or phenyl radicals with the preferred specific radical being methyl.

The liquid silanol chain-stopped polydiorganosiloxanes of Formula 2 are well known in the art and include compositions containing more than one type of R'' group. For example, some of the R'' groups can be methyl, while others of the R'' groups can be phenyl and/or beta-cyanoethyl. Furthermore, within the scope of Formula 2 are copolymers of various types of diorganosiloxane units, such as, for example, silanol chain-stopped copolymers of dimethylsiloxane units, diphenylsiloxane units and methylphenylsiloxane untis or, for example, copolymers of dimethylsiloxane units, methylphenylsiloxane units and methylvinylsiloxane units. In any event, it is preferred that at least 50% of the R'' groups of the liquid silanol chain-stopped polydiorganosiloxanes be methyl groups. Furthermore, it is contemplated that a mixture of various liquid silanol chain-stopped polydiorganosiloxanes within the scope of Formula 2 can be employed. While the materials within the scope of Formula 2 have been described as polydiorganosiloxanes, it should be understood that such materials can contain minor amounts, e.g., up to about 1.0% of monoorganosiloxane units or triorganosiloxane units, such as, for example, monomethylsiloxane units, monophenylsiloxane units or trimethylsiloxane units.

The liquid silanol chain-stopped polydiorganosiloxanes employed in the practice of the present invention can vary from thin fluids up to viscous gums, depending upon the value of $n$ in Formula 2 and the nature of the particular organic groups represented by R''. Preferably, however, the silanol chain-stopped polydiorganosiloxane is selected to have a viscosity in the range of about 100 centipoise to 50,000 centipoise when measured at 25° C.

The room temperature curing silicone rubber compositions of the present invention are prepared by simply mixing one or more alkoxyacyloxysilane of Formula 1 with the silanol chain-stopped polydiorganosiloxane liquid of Formula 2. Since the alkoxyacyloxysilanes of Formula 1 will tend to hydrolyze upon contact with moisture, care should be exercised to exclude moisture during the addition of the alkoxyacyloxysilane to the liquid silanol chain-stopped polydiorganosiloxane. Likewise, care should be taken that the mixture of the alkoxyacyloxysilane of Formula 1 and the liquid silanol chain-stopped polydiorganosiloxane of Formula 2 is maintained under substantially anhydrous conditions if it is desired to store the mixture for an extended period of time in the liquid state prior to conversion of the material to the cured, solid, elastic silicone rubber state. On the other hand, if it is desired to permit the mixture to cure immediately upon addition of the alkoxyacyloxysilane to the liquid polydiorganosiloxane, no special precautions need be taken and the two materials can be merely mixed and placed in the form or shape in which it is desired for the material to be cured.

The amount of the alkoxyacyloxysilane added to the liquid silanol chain-stopped polydiorganosiloxane can vary within wide limits. However, for best results, it is preferred to add in excess of one mole of the alkoxyacyloxysilane per mole of silicon-bonded hydroxyl groups in the liquid silanol chain-stopped polydiorganosiloxanes. Satisfactory curing can be obtained, for example, with from 1.1 to 4 moles of the alkoxyacyloxysilane per mole of silicon-bonded hydroxyl groups in the polydiorganosiloxane fluid. Satisfactory results can be obtained, however, with amounts of the alkoxyacyloxysilane as low as 1.0 mole per mole of the silanol chain-stopped polydiorganosiloxane. No particular benefit is derived from using more than 4 moles of the alkoxyacyloxysilane per mole of the polydiorganosiloxane fluid. The temperature of the addition of the alkoxyacyloxysilane of Formula 1 to the liquid silanol chain-stopped polydiorganosiloxane is immaterial, with the addition generally being effected at a temperature of from about 20 to 80° C.

A wide choice of components is available in the preparation of the room temperature curing organopolysiloxanes of the present invention. In general, the particular components employed are a function of the properties desired in the final product. Thus, with a particular alkoxyacyloxysilane, some variation in the properties of the cured silicone rubber are obtained by varying the molecular weight (as measured by viscosity) of the liquid silanol chain-stopped polydiorganosiloxane. For a given system, as the viscosity of the silanol chain-stopped starting material increases, the tensile strength and hardness of the final product decreases while the elongation increases. On the other hand, with a lower viscosity material, the cure is tighter so that the final product has a lower elongation but a higher tensile strength and increased hardness.

While the characteristics of the final product can be varied as described by varying the silanol chain-stopped polydiorganosiloxane, a particular benefit of the present invention is the ability to vary the properties of the final cured silicone rubber without varying the particular silanol chain-stopped polydiorganosiloxane employed. This variation in properties is obtained by selection of the particular alkoxyacyloxysilane or mixture of alkoxyacyloxysilanes employed with the silanol chain-stopped polydiorganosiloxane. A number of general statements can be made as to the effect of varying this silane. For example, silanes of Formula 1, in which the sum of $a$ and $b$ is 3, have improved adhesion of the final cured product to many substrates as compared with the adhesion obtained from certain prior art materials, such as methyltriacetoxysilanes. On the other hand, compositions within the scope of Formula 1, where the sum of $a$ plus $b$ is equal to 4, have greater adhesion than those compositions where the sum of $a$ plus $b$ is equal to 3. Compositions of Formula 1, where the sum of $a$ plus $b$ is equal to 3, result in compositions of greater work life than compositions where the sum of $a$ plus $b$ is equal to 4. Compositions of Formula 1, where $b$ is equal to 1, have a markedly decreased acid odor during curing as compared with compounds in which $b$ is equal to 2 or 3. Likewise, there is less tendency of the former materials to corrode than with the latter materials. Finally, all of the silanes of Formula 1 lead to room temperature curing organopolysiloxanes of more satisfactory cure in thick sections than prior art compositions employing a compound such as methyltriacetoxysilane.

Compositions prepared by mixing the alkoxyacyloxysilane of Formula 1 with the liquid silanol chain-stopped polydiorganosiloxanes can be used without further modification in many sealing, caulking or coating applications by merely placing the compositions in the desired place and permitting them to cure upon exposure to the moisture present in the atmosphere. Upon exposure of such compositions to atmospheric moisture, even after storage for times as long as two years or more, a hard "skin"

will form on the compositions shortly after exposure and complete cure to the rubbery state will have been effected within 12 to 36 hours, all at room temperature. The time required for the formation of such skin can vary from a minimum of about 15 to 30 minutes up to 2 to 3 hours.

It is often desirable to modify the compositions of the present invention by the addition of various materials which act as extenders or which change various properties, such as cure rate, color or cost. For example, if it is desired to reduce the time required for complete cure by a factor of from about 2 to 5 without affecting the work life of the room temperature vulcanizing composition, the composition can be modified by the incorporation of a minor amount of carboxylic acid salt of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrates, dibutyl tin diacetate, dibutyl tin dilaurate, divinyl tin diacetate, dibuty tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, trisphenyl lead cyclohexenyl acetate, triphenyl lead ethylmalonate, etc.

The amount of the metal salt of the organic carboxylic acid which can be employed in the practice of the present invention is a function of the increased rate of curing desired so that any amount of such salt up to the maximum effective amount for increasing the cure rate can be employed. In general, no particular benefit is derived from employing more than about 5% by weight of such metal salt based on the weight of the silanol chain-stopped polydiorganosiloxane fluid. Preferably, where such metal salt is employed, it is present in an amount equal to from about 0.01% to 2.0% by weight, based on the weight of the polydiorganosiloxane fluid.

The compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts of from about 20 to 200 parts filler per 100 parts of the liquid silanol chain-stopped polydiorganosiloxane of Formula 2.

In addition to the modification of the compositions of the present invention by the addition of metal salt cure accelerators and fillers, these compositions can also be modified by the incorporation of various flame retardants, stabilizing agents and plasticizers such as siloxane fluids. Suitable flame retardants include antimony oxide, various polychlorinated hydrocarbons and organic sulfonates.

Where the compositions of the present invention contain components other than the alkoxyacyloxysilane of Formula 1 and the polydiorganosiloxane fluid of Formula 2, the various ingredients can be added in any desired order. However, for ease of manufacturing, it is often convenient to form a blend or mixture of all of the components of the room temperature vulcanizing organopolysiloxane except the alkoxyacyloxysilane, to then remove moisture from the resulting mixture by maintaining the mixture under vacuum and thereafter to add the alkoxyacyloxysilane of Formula 1 prior to packaging of the compositions in containers protected from moisture. Of course, where it is desired to permit the curable composition to cure immediately upon formation, no special precautions need be taken during the addition of the alkoxyacyloxysilane of Formula 1 and the mixture is allowed to cure in the desired shape.

The room temperature curing silicone rubber compositions of the present invention are particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The following examples are illustrative of the practice of my invention and are not intended for purposes of limitation. All parts are by weight.

*Example 1*

Silicon tetraacetate was prepared by adding 170 parts silicon tetrachloride and 665 parts acetic anhydride to a reaction vessel and heating until the theoretical amount of acetyl chloride had been distilled from the reaction mixture. The remaining acetyl chloride and the excess acetic anhydride were stripped off and silicon tetraacetate began to precipitate as fine white crystals. The reaction mixtures was cooled and the crystals were washed three times with equal volumes of a toluene-hexane mixture and finally with hexane to produce tetraacetoxysilane. Various methoxyacetoxysilanes were prepared by adding 693 parts of tetraacetoxysilane and 100 parts of toluene to a reaction vessel and cooling the reaction mixture to a temperature of from −15 to −20° C. Over a three hour period, 166 parts of methanol was slowly added. At the end of this time, the reaction mixture slowly warmed to room temperature and toluene and acetic acid were stripped from the reaction mixture. The residue was then distilled to produce trimethoxyacetoxysilane, which boiled at 37 to 40° C. at 2 mm. Hg, dimethoxydiacetoxysilane, which boiled at 54 to 57° C. at 0.6 mm. Hg, and methoxytriacetoxysilane, which boiled at 75 to 80° C. at 0.3 mm. Hg. The methoxytriacetoxysilane was a low melting solid which easily supercools as a liquid. To separate 100 part portions of a 3,000 centipoise (at 25° C.) silanol chain-stopped polydimethylsiloxane containing 0.3 weight percent silicon-bonded hydroxyl groups were added 5 parts, respectively, of trimethoxyacetoxysilane, dimethoxyacetoxysilane and methoxytriacetoxysilane. A portion of each of the three materials was exposed to atmospheric moisture by being poured to a depth of 0.25 inch in an aluminum cup and the remainder of each mixture was retained in a sealed container. By the end of three hours, the materials in each of the three cups had a hard, tack-free surface. By the end of 36 hours, the material in each of the three cups had cured to the solid, elastic state. When an attempt was made to remove each of the materials from the aluminum cups, rupture occurred in the bulk of the material rather than at the interface between the silicone rubber and the aluminum surface. Examination of the three cured materials showed that the material prepared from the methoxytriacetoxysilane had the highest tensile strength and was the hardest, while the material prepared from the trimethoxyacetoxysilane had the lowest tensile strength and was the softest. The greatest elongation was observed in the material prepared from the trimethoxyacetoxysilane and the lowest elongation was found in the material prepared from the methoxytriacetoxysilane. After storage of the materials in the sealed containers for 60 days, additional samples were poured into aluminum cups. The same rate of cure was observed with these 60 day old samples as was originally observed. One notable difference between the three materials was that the material prepared from the methoxytriacetoxysilane exhibited the most noticeable acetic acid odor during cure, while that prepared from the trimethoxyacetoxysilane showed the least odor. Another sample of each of the three materials being stored was mixed with dibutyl tin dilaurate in the ratio of 0.5 part dibutyl tin dilaurate per 100 parts of the silanol chain-stopped polydiorganosiloxane used in forming the mixture. Samples of each of these materials were poured into an aluminum cup to a depth of 0.20 inch and each of the three materials had completely cured to the solid, elastic state within 12 hours and no significant difference was observed between the physical properties of the three materials.

*Example 2*

To a reaction vessel was added 210 parts of tetraacetoxysilane and 32 parts toluene. The resulting slurry was stirred and cooled to from 0 to 5° C. in an ice bath and 107 parts isopropanol was added dropwise over a two hour period. The mixture was allowed to warm to room temperature and stirring was continued for an additional five hours. Toluene and acetic acid were removed by stripping and the residue was fractionally distilled to produce triisopropoxyacetoxysilane having a boiling point of 60° C. at 2 mm. Hg, diisopropoxydiacetoxysilane having a boiling point of 65° C. at 0.1 mm. Hg, and isopropoxytriacetoxysilane having a boiling point of 80° C. at 0.1 mm. Hg. Following the procedure of Example 1, three 100 part portions of a silanol chain-stopped polydimethylsiloxane having a viscosity of 3,000 centipoise at 25° C. and containing 0.30 weight percent silicon-bonded hydroxyl groups were prepared and to these portions were added, respectively, 8 parts of triisopropoxyacetoxysilane, 8 parts diisopropoxydiacetoxysilane and 8 parts isopropoxytriacetoxysilane. Within 2 to 3 hours after exposure to atmospheric moisture, each of the resulting compositions became tack-free and within 36 hours, each of the three compositions had cured to an elastic silicone rubber.

*Example 3*

To a reaction vessel were added 396 parts tetraacetoxysilane and 148 parts ethyl orthosilicate. This reaction mixture was heated at a temperature of 125° C. for 16 hours and resulted in a mixture which was fractionally distilled to yield triethoxyacetoxysilane having a boiling point of 59 to 60° C. at 2.5 mm. Hg, diethoxydiacetoxysilane having a boiling point of 53 to 56° C. at 0.1 mm. Hg, and ethoxytriacetoxysilane having a boiling point of 74 to 77° C. at 0.1 mm. Hg. To a silanol chain-stopped copolymer of dimethylsiloxane units and diphenylsiloxane units having the diphenylsiloxane units present in a ratio of 3 mole percent, based on the total moles of diorganosiloxane units and having a viscosity at 25° C. of 10,000 centipoise and containing 0.1 weight percent silicon-bonded hydroxyl groups, were added various amounts of the ethoxyacetoxysilanes. More particularly, 2.5 parts of each of the just described ethoxysilanes were added under anhydrous conditions to separate 100 part portions of the silanol chain-stopped copolymer. Portions of each of the resulting mixtures were poured into aluminum cups to a depth of 0.2 inch and allowed to stand for 24 hours in contact with the atmosphere. At the end of this time, each of the three materials had cured to a rubber. After storage in sealed containers for 90 days, additional samples of each of the mixtures were poured into aluminum cups to the same depth and similar curing results were obtained. It was noted during the curing that the acetic acid odor evolved from the triethoxyacetoxysilane was lower than the odor evolved from the ethoxytriacetoxysilane. Of the three materials, the composition prepared from the triethoxyacetoxysilane was the softest while that from the ethoxytriacetoxysilane had the tightest cure. When additional samples of each of these three materials were modified by the addition of 0.04 part of dibutyl tin dilaurate per 100 parts of the silanol chain-stopped dimethylsiloxane-diphenylsiloxane copolymer, all of the samples had cured to a firm rubber, indistinguishable from each other, in a period of less than 12 hours.

*Example 4*

This example illustrates compositions within the scope of the present invention prepared from 1,1,1-trichloro-2-methyl-2-propoxytriacetoxysilane. The silane was prepared by adding 200 parts 1,1,1-trichloro-2-methyl-2-hydroxypropane (containing about 5 percent water of hydration) and 865 parts toluene in a reaction vessel and removing the water of hydration by azeotropic distillation. The solution was then cooled to a temperature of 75° C. and 125 parts dimethylaniline was added. The mixture was then cooled to room temperature and 200 parts silicon tetrachloride was added with stirring. The reaction mixture was heated to a temperature of 112° C. over a 5 hour period and then allowed to cool overnight. The resulting material contained a precipitate from which the liquid was decanted and then filtered. The filtrate was fractionally distilled to produce 1,1,1-trichloro-2-methyl-2-propoxytrichlorosilane having a boiling point of 70° C. at 2.0 mm. Hg. This material was then mixed with sufficient acetic anhydride to provide 3 moles of anhydride per mole of the trichlorosilane. This resulted in a reaction mixture which was stripped of acetyl chloride and then distilled to yield the 1,1,1-trichloro-2-methyl-2-propoxytriacetoxysilane which boiled at 120 to 130° C. at 0.01 mm. Hg. The resulting triacetoxysilane was added in an amount of 7 parts to 100 parts of a silanol chain-stopped polydimethylsiloxane having a viscosity of 3,000 centipoise at 25° C. and containing 0.3 percent by weight silicon-bonded hydroxyl groups, with the addition being conducted under anhydrous conditions. After storage under anhydrous conditions for one week, a sample of this material was poured into an aluminum cup to a depth of 0.2 inch and within 24 hours, the material in the cup had thoroughly cured to a silicone rubber.

*Example 5*

A number of room temperature vulcanizing compositions were prepared from the various ethoxyacetoxysilanes whose preparation was described in Example 2. The compositions which were prepared included both filled and unfilled organopolysiloxanes. The various compositions were prepared by adding the components specified in Table 1 below, in the amounts specified in the table, to 100 parts of a "Base Fluid" which was a silanol chain-stopped polydimethylsiloxane having a viscosity of 3,000 centipoise at 25° C. and containing 0.3 weight percent silicon-bonded hydroxyl groups. Where a filler was employed, the filler was a finely divided fumed silica. The numbers in the table indicate the parts of the various components present in the composition. In the table, "EtO" is ethoxy and "OAc" is acetoxy. All of the compositions described in the table were prepared under substantially anhydrous conditions.

TABLE 1

| Run | 1 | 2 | 3 | 4 | 5 | 6 | 7 | 8 | 9 | 10 | 11 |
|---|---|---|---|---|---|---|---|---|---|---|---|
| Base Fluid | 100 | 100 | 100 | 100 | 100 | 100 | 100 | 100 | 100 | 100 | 100 |
| Filler | | | | | | 20 | 20 | 20 | | 20 | |
| (EtO)Si(OAc)$_3$ | 4 | 6 | 10 | | | 5 | | | 2.0 | 2.0 | 2.5 |
| (EtO)$_2$Si(OAc)$_2$ | | | | 4 | | | 5 | | 2.0 | 2.0 | 2.5 |
| (EtO)$_3$Si(OAc) | | | | | 4 | | | 5 | 2.0 | 2.0 | |

All of the formulations of Table 1 above were exposed to the atmosphere in films about 5 mils thick. In the case of those materials containing no filler, the films were prepared by pouring the liquids to a depth of about 5 mils in an aluminum cup. In the case of those materials containing filler, the resulting pastes were spread on a sheet of aluminum foil to a thickness of about 5 mils. In all cases, the materials cured to a silicone rubber within about 24 hours.

*Example 6*

To a reaction vessel was added 182 parts methyltriacetoxysilane and 350 parts benzene. This mixture was stirred while 45 parts of sodium methoxide was added over a period of about 1.5 hours, with the rate of addition being controlled so that the maximum exothermic temperature of the reaction was about 50° C. During the reaction, crystalline sodium acetate was formed which was filtered from the reaction mixture, yielding a filtrate containing benzene which was stirpped. Fractional distillation of the resulting product yielded diacetoxymethoxymethylsilane having a boiling point of 38° C. at 0.55 mm. Hg. Chemical analysis of this reaction mixture showed the presence of 61.7% acetoxy groups as compared with the theoretical value of 61.4%. When 10 parts of this methoxydiacetoxymethylsilane were added to 100 parts of a 10,000 centipose silanol chain-stopped polydimethylsiloxane fluid containing 0.1 weight percent silicon-bonded hydroxyl groups, under atmospheric conditions, the resulting mixture cured to a firm silicone rubber within 24 hours.

*Example 7*

Following the procedure of Example 6, methyl-t-butoxydiacetoxysilane was prepared by reacting methyltriacetoxysilane with potassium-t-butoxide. Seven parts of the methyl-t-butoxydiacetoxysilane and 0.5 part of dibutyl tin dilaurate were added with stirring under substantially anhydrous conditions to a mixture of 20 parts of fumed silica in 100 parts of a silanol chain-stopped polydimethylsiloxane having a viscosity of 5,000 centipoise at 25° C. and containing 0.2 weight percent silicon-bonded hydroxyl groups. A portion of the resulting material was removed after storage for 60 days and spread on an aluminum plate. After 24 hours, this material had cured to a silicone rubber which could not be stripped from the aluminum plate without rupture occurring in the body of the rubber.

*Example 8*

Following the procedure of Example 6, beta-cyanoethyltrichlorosilane is converted to beta-cyanoethyltripropionoxysilane by the reaction of the beta-cyanoethyltrichlorosilane with the anhydride of propionic acid. The resulting triacyloxysilane is then reacted with sodium methoxide to produce methylmethoxydipropionoxysilane. Five parts of this material and 1.0 part of lead octoate are added to 100 parts of the silanol chain-stopped polydiorganosiloxane of Example 7 and the resulting mixture is poured into an aluminum cup to a depth of 0.1 inch and exposed to atmospheric moisture for 24 hours. At the end of this time, the resulting material has cured completely to a silicone rubber.

*Example 9*

To a reaction vessel was added 260 parts of tetraacetoxysilane and 500 parts toluene and the reaction mixture was maintained at a temperature of from 5 to 10° C. while 70 parts n-butyl alcohol was slowly added over a two hour period. At the end of this time, the resulting product was fractionally distilled to produce n-butoxytriacetoxysilane having a boiling point at 80° C. at 0.01 mm. Hg. A paste was prepared by mixing 20 parts of fumed silica into 100 parts of the 3,000 centipoise silanol chain-stopped polydimethyl siloxane of Example 1. This material was carefully dried and under anhydrous conditions 5 parts of the n-butoxytriacetoxysilane and 0.05 part of dibutyl tin dilaurate were added. This material was then exposed to an atmosphere having a temperature of 70° C. and a relative humidity of 50% and its cure was watched. In less than 5 minutes, the material had begun to cure, as evidenced by the fact that it was no longer workable. At the end of 35 minutes, the material was completely tack-free. Physical properties at the end of 24 hours at room temperature showed a Shore A hardness of 46, a tensile strength of 533 p.s.i., an elongation of 250% and a tear strength of 28 pounds per inch.

*Example 10*

A paste was prepared as in Example 9 by adding 20 parts of fumed silica to 100 parts of the 3,000 centipoise silanol chain-stopped polydimethylsiloxane. To this mixture was added, under substantially anhydrous conditions, 1 part of ethoxytriacetoxysilane, 2 parts diacetoxydiethoxysilane and 2 parts triethoxyacetoxysilane and .05 part of dibutyl tin dilaurate. After carefully mixing these components, a portion of the reaction mixture was exposed to an atmosphere having a temperature of 70° F. and a 50% relative humidity. This material had a work life of less than 6 minutes, was tack-free in less than 40 minutes and its physical property measurements showed a tensile strength of 400 p.s.i. and an elongation of 275%. when the process of this example was repeated except that the composition also contained 0.5 part of tetraacetoxysilane, similar results were obtained.

*Example 11*

A room temperature vulcanizing composition was prepared by adding 6 parts of n-butoxytriacetoxysilane to 100 parts of a 3,000 centipoise silanol chain-stopped polydimethylsiloxane containing 0.3% silicon-bonded hydroxyl groups. A portion of this mixture was poured into an aluminum cup to a depth of 0.20 inch and the cure of the material in the cup was observed. By the end of one hour, a hard crust had formed on the top of the material and within 24 to 36 hours, the material had cured completely to a silicone rubber which adhered tenaciously to the aluminum surface.

*Example 12*

To a mixture of 530 parts tetraacetoxysilane in 860 parts toluene was slowly added over a three hour period 150 parts t-butyl alcohol while the reaction mixture was maintained at a temperature of from about 0 to 10° C. At the end of this time, the reaction mixture was stripped of solvent, acetic acid and other volatiles, resulting in a composition consisting of 60 mole percent t-butoxytriacetoxysilane, 20 mole percent di-t-butoxydiacetoxysilane and 20 mole percent unreacted tetraacetoxysilane. Six parts of this composition was added to 100 parts of a silanol chain-stopped polydimethylsiloxane having a viscosity of 3,000 centipoise at 25° C. and containing 0.3 weight percent silicon-bonded hydroxyl groups. A portion of this product was poured into an aluminum cup to a depth of 0.15 inch and its cure was observed. By the end of about 45 minutes, a hard skin had formed on the surface of the material and within 24 hours, the material had cured to a strong silicone rubber which adhered to the surface of the aluminum cup. After 90 days, a second portion of the composition containing the tetraacetoxysilane and the two alkoxyacyloxysilanes was again poured into an aluminum cup and similar cure characteristics were observed.

While the foregoing examples have illustrated a number of the embodiments of my invention, it is understood that the present invention relates to a broad class of room temperature curing silicone rubber compositions which are characterized by curing to the solid, elastic state at room temperature upon exposure to normal atmospheric moisture and which are further characterized by an extended shelf life in anhydrous atmospheres. These materials are obtained by mixing a silanol chain-stopped polydiorganosiloxane of the class described with an alkoxyacyloxysilane of Formula 1. In addition to mixing a single silanol fluid with a single alkoxyacyloxysilane of formula 1, a mixture of two or more of such liquids may be employed with a mixture of two or more of such alkoxyacyloxysilanes. Furthermore, during the reaction, the presence of additional cure accelerators, such as metallic salts of the class described, is not precluded. Likewise, the presence of minor amounts of tetraacyloxysilanes, e.g., up to about 20% by weight, based on the weight of the alkoxyacyloxysilane of Formula 1 is not precluded and in certain cases can provide beneficial results.

What I claim as new and desire to secure by Letters Patent of the United States is:

1. A composition stable under anhydrous conditions and curable to the solid, elastic state upon exposure to atmospheric moisture comprising a liquid silanol chain-stopped polydiorganosiloxane in which the organo groups are selected from the class consisting of monovalent hydrocarbon radicals, halogenated monovalent hydrocarbon radicals and cyanoalkyl radicals and an alkoxyacyloxysilane in which the four valences of silicon are satisfied by either zero or one silicon-bonded radical selected from the class consisting of monovalent hydrocarbon radicals, halogenated monovalent hydrocarbon radicals and cyanoalkyl radicals, at least one radical selected from the class consisting of alkoxy radicals and halogenated alkoxy radicals and at least one saturated aliphatic monoacyl radical.

2. A room temperature curing organopolysiloxane composition stable under anhydrous conditions and curable to the solid, elastic state upon exposure to atmospheric moisture comprising a liquid silanol chain-stopped polydiorganosiloxane having the formula:

$$HO[(R'')_2SiO]_nH$$

and an aloxyacyloxysilane having the formula:

$$(R)_{4-a-b}Si(OR')_a(OY)_b$$

where R and R'' are members selected from the class consisting of monovalent hydrocarbon radicals, halogenated monovalent hydrocarbon radicals and cyanoalkyl radicals, R' is a member selected from the class consisting of alkyl radicals and halogenated alkyl radicals, y is a satuarted aliphatic monoacyl radical, a is an integer equal to from 1 to 3, inculsive, b is an integer equal to from 1 to 3, inclusive, and the sum of a plus b is equal to from 3 to 4, inclusive, and n has a value of at least 10.

3. A composition stable under anhydrous condtions and curable to the solid, elastic state upon exposure to atmospheric moisture comprising a silanol chain-stopped polydimethylsiloxane having a viscosity of from about 100 to 50,000 centipoise at 25° C. and an alkoxyacyloxysilane having the formula:

$$(R)_{4-a-b}Si(OR')_a(OY)_b$$

where R is a member selected from the class consisting of monovalent hydrocarbon radicals, halogenated monovalent hydrocarbon radicals and cyanoalkyl radicals, R' is a member selected from the class consisting of alkyl radicals and halogenated alkyl radicals, Y is a saturated aliphatic monoacyl radical, a has a value of from 1 to 3, inclusive, b has a value of from 1 to 3, inclusive, and the sum of a plus b is equal to from 3 to 4, inclusive.

4. The composition of claim 3 in which the alkoxyacyloxysilane is a material in which R and R' are methyl and Y is acetyl.

5. The composition of claim 3 in which R is methyl, R' is propyl and Y is acetyl.

6. The composition of claim 3 in which R is methyl, R' is ethyl and Y is acetyl.

7. The composition of claim 3 in which R is methyl, R' is 1,1,1,-trichloro-2-methyl-2-propyl and Y is acetyl.

8. The composition of claim 3 in which R is methyl, R' is t-butyl and Y is acetyl.

9. The process for preparing a composition stable under anhydrous conditions and cuarble to the solid, elastic state upon exposure to atmospheric moisture, which comprises adding under substantially anhydrous conditions to a liquid silanol chain-stopped polydiorganosiloxane in which the organo groups are selected from the class consisting of monovalent hydrocarbon radicals, halogenated monovalent hydrocarbon radicals and cyanoalkyl radicals, an alkoxyacyloxysilane in which the four valences of silicon are satisfied by either zero or one radical selected from the class consisting of monovalent hydrocarbon radicals, halogenated monovalent hydrocarbon radicals and cyanoalkyl radicals, at least one radical selected from the class consisting of alkoxy radicals and halogenated alkoxy radicals and at least one saturated monovalent acyl radical.

10. The process for preparing a composition stable under anhydrous conditions and curable to the solid, elastic state upon exposure to atmospheric moisture comprising mixing under substantially anhydrous conditions a silanol chain-stopped polydiorganosiloxane having the formula:

$$HO[(R'')_2SiO]_nH$$

and an alkoxyacyloxysilane having the formula:

$$(R)_{4-a-b}Si(OR')_a(OY)_b$$

where R and R'' are members selected from the class consisting of monovalent hydrocarbon radicals, halogenated monovalent hydrocarbon radicals and cyanoalkyl radicals, R' is a member selected from the class consisting of alkyl radicals and halogenated alkyl radicals, Y is a saturated aliphatic monoacyl radical, a has a value of from 1 to 3, inclusive, b has a value of from 1 to 3, inclusive, the sum of a plus b is equal to from 3 to 4, inculsive, and n has a value of at least 10.

References Cited by the Examiner

UNITED STATES PATENTS

| 3,035,016 | 5/1962 | Bruner | 260—448.8 |
| 3,046,242 | 7/1962 | Santelli | 260—46.5 |
| 3,077,465 | 2/1963 | Bruner | 260—46.5 |
| 3,105,061 | 9/1963 | Bruner | 260—448.8 |

FOREIGN PATENTS

| 851,578 | 10/1960 | Great Britain. |
| 1,198,749 | 12/1960 | France. |

LEON J. BERCOVITZ, *Primary Examiner.*

M. I. MARQUIS, *Assistant Examiner.*

UNITED STATES PATENT OFFICE
CERTIFICATE OF CORRECTION

Patent No. 3,296,195                        January 3, 1967

John C. Goossens

It is hereby certified that error appears in the above numbered patent requiring correction and that the said Letters Patent should read as corrected below.

Column 1, line 65, column 2, lines 31 and 37, and column 11, line 67, for "y", in italics, each occurrence, read -- Y --.

Signed and sealed this 24th day of October 1967.

(SEAL)
Attest:

Edward M. Fletcher, Jr.                     EDWARD J. BRENNER
Attesting Officer                           Commissioner of Patents